F. L. HUGGINS.
METHOD OF RECOVERING RESIN FROM WASTE PRODUCTS.
APPLICATION FILED JAN. 13, 1912.
1,022,194.
Patented Apr. 2, 1912.
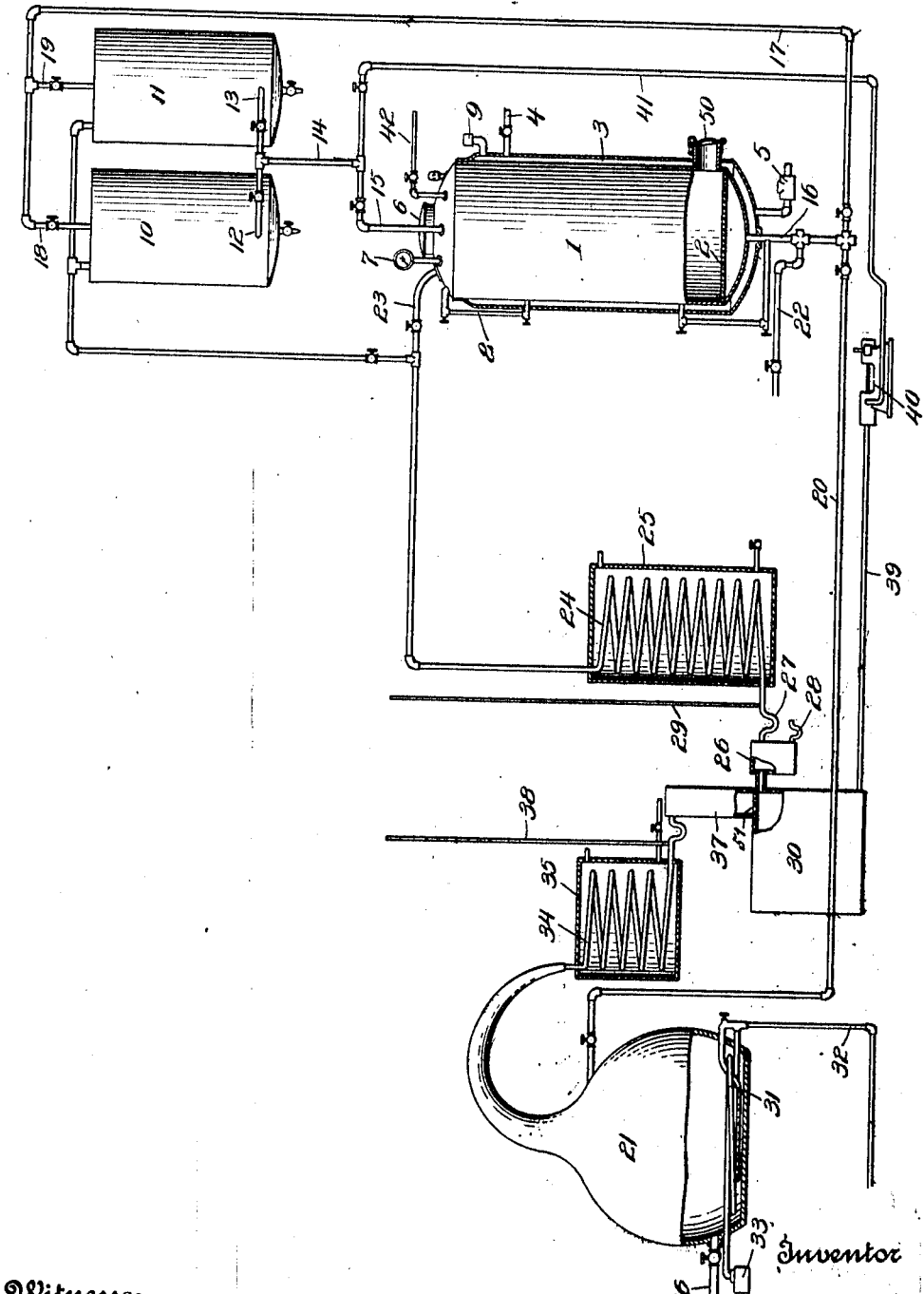

UNITED STATES PATENT OFFICE.

FRANK L. HUGGINS, OF WILMINGTON, NORTH CAROLINA, ASSIGNOR OF ONE-HALF TO JOHN P. MOORE, JR., OF WILMINGTON, NORTH CAROLINA.

METHOD OF RECOVERING RESIN FROM WASTE PRODUCTS.

1,022,194.                    Specification of Letters Patent.    Patented Apr. 2, 1912.

Application filed January 13, 1912. Serial No. 671,058.

*To all whom it may concern:*

Be it known that I, FRANK L. HUGGINS, a citizen of the United States, and resident of Wilmington, county of New Hanover, State of North Carolina, have invented certain new and useful Improvements in Methods of Recovering Resin from Waste Products, of which the following is a specification.

This invention is designed to effectively recover the rosin which is contained in what are now regarded as waste products. For instance, the dross separated from crude turpentine prior to distillation contains considerable rosin and difficulty has been experienced in properly recovering it. This is true also of other material including rosin mixed with foreign matter, such as dirt, in such way that separation is difficult and my invention is adapted for use upon all material of such character.

My method of recovery involves the use of simple mechanism or apparatus and is not only easy to perform but accomplishes the desired separation and recovery effectively.

The novel features of the invention will be apparent from the following description taken in connection with the drawing.

The single figure of the drawing is a diagrammatic view partly in section, showing an arrangement of apparatus which may be used in carrying out the method.

In the drawing I have shown a chamber 1 which I term a "digester" and which is preferably made in the form of a vertical cylinder having a foraminous screen 2 near its bottom. There is a steam jacket 3 around the sides and bottom of the chamber provided with steam inlet 4 and a trap drain 5 at the bottom. There is a manhole at the top provided with a cover 6 providing means for admitting successive supplies of the material to be treated. An outlet is also provided in the side of the chamber immediately above the screen 2 provided with the door 50 for the purpose of removing the residue of solid matter remaining in the chamber after my treatment. This chamber 1 is provided with a pressure-gage 7 and a transparent tube 8 for indicating the height of liquid within the chamber and the steam jacket 3 is provided with a safety-valve 9.

Two tanks 10 and 11 for containing a solvent of rosin are placed preferably at a higher level than the chamber 1 so that the solvent will pass by gravity through those tanks to the chamber. The solvent which I use is preferably gasolene, although the invention is not confined to that material. The tanks 10 and 11 are connected to the chamber but by means of the pipes 12 and 13, communicating with the pipe 14 which in turn connects with pipe 15 leading into the top of the chamber 1 and since these pipes are provided with suitable valves the solvent may be admitted from either one of the tanks 10 and 11 to the chamber 1. A pipe 16 leads from the bottom of the chamber but below the screen 2 and it is connected to the pipe 17 leading up above the tanks 10 and 11 and having connections 18 and 19 therewith so that the liquid when it is forced out through the pipe 16 at the bottom of the chamber will pass up to the tank 10 or 11 in accordance with which of the valves is open. A pipe 20 also connects with the outlet pipe 16 and leads to a still 21 where the material consisting of the solvent saturated with rosin is distilled in order to separate and remove the rosin. A steam pipe 22 connects with the outlet pipe 16 whereby steam may be forced into the bottom of the chamber 1 and a vapor outlet pipe 23 connects with the chamber at the top and connects with a condensing coil 24 in the chamber 25, adapted to contain a cooling material such as water. The condensed steam and solvent passing through the coil 24 enters the separator 26 where the solvent and water are separated, the inlet pipe being provided with a trap 27 and the trap 28 being also placed at the bottom of the separator. A pipe 29 is also connected to the inlet pipe for the purpose of a vent for vapor. The condensed solvent passes from the separator 26 into the tank 30.

The distilling apparatus 21 has in its bottom a steam coil 31 supplied from the pipe 32 and connected with this coil there is a steam trap 33. When the saturated solvent has entered the apparatus 21 through the pipe 20 it is distilled, the vapors passing off at the top and into the condensing coil 34 in the chamber 35 containing a cooling fluid such as water. The rosin remaining in the chamber 21 at the end of the distilling operation may be drawn off through pipe 36. The condensed vapors passing through coil 34 pass into the separator 37 where the water is separated from the solvent and it will be seen that the connecting pipe is provided with the vent pipe 38 for vapors. The solvent from the separator 37 passes down into the solvent tank 30 through the opening 51 shown in its top from which it may be forced back up to the tanks 10 and 11 by means of the pipe 39, the force pump 40, the pipe 41 and the pipe 14.

In carrying out my method in the apparatus above described, the operation is as follows: Gasolene or other solvent is placed in the two tanks 10 and 11, thus having two separate supplies of the solvent. The chamber 1 is charged with the waste product containing rosin as described and the manhole 6 and valves in the pipes are closed and the solvent from tank 11 is then allowed to pass down into the chamber 1 so as to almost submerge the entire charge of material. Steam is admitted to the jacket 3 so as to boil the solvent in contact with the material so as to quickly dissolve the rosin which it contains, it being understood that the valve 23 is open during the admission of the solvent and during the boiling operation so as to permit the escape of any pressure or vapor through the pipe connection to the condenser 24 where it is recovered. The valves in the outlet pipes 16 and 17 are opened when the extraction is complete, valve 23 closed and steam is admitted to the upper portion of the chamber 1 by means of the pipe 42, the pressure of this steam serving to force the partly saturated solvent down through the screen 2 in the outlet 16 and back up to the tank 11. When the solvent has been forced out the outlet pipe is closed and the valves in pipes 22 and 23 are opened whereby steam will be forced into the bottom of the chamber through the outlet 16 and will pass up over the remaining portion of the material, removing therefrom the particles of solvent which still adhere to it, the steam carrying these particles of solvent out through the pipe 23 and into the condensing coil 24 and from there to the separator 26 where the solvent is recovered. The residue of the charge of material thus treated in the chamber 1 is then removed through the door 50 and a new charge is placed in the chamber. The partly saturated solvent in tank 11 is then permitted to pass down into the chamber 1 so as to submerge the new charge of material. After being heated as above described, so as to dissolve the rosin the solvent is again forced out through the outlet at the bottom and back to the tank 11 by steam pressure admitted through the pipe 42. The outlet pipe is then closed and a supply of fresh solvent in tank 10 is permitted to pass down into the chamber 1, thus subjecting the charge of material to the action of this new supply of solvent. This second supply of solvent is then forced out through the bottom by steam pressure as above described and back into tank 10. Steam is then admitted through pipe 22 to the bottom of the chamber 1 and passes as above described up through the material and out through the pipe 23 to the condenser and separator. The residue in the chamber 1 is then removed and a new charge is placed in the chamber. The partly saturated solvent in tank 11 is then passed down into the chamber 1 over the material so as to submerge it and so that it will partly remove the rosin contained in it. It will be observed that the solvent now in the chamber 1 has been used to successively treat three new charges of material and it is therefore sufficiently saturated with rosin. The valve in pipe 20 is then opened and steam is admitted through pipe 42, thus forcing the saturated solvent into the distilling apparatus 21 where, as above described, the rosin is separated from the solvent and the solvent is recovered in the condensing coil 34 and separator 37. The recovered solvent which passes down to the solvent tank 30 is then forced by pump 40 back to the tank 11, where it is ready for use again. The partly saturated solvent in tank 10 is passed down into chamber 1 to act on the charge of material which had been acted on by the solvent from tank 11. This solvent from tank 10 is then forced out from the chamber 1 back into the tank 10 and the material remaining is subjected to the action of steam admitted through the pipe 22 as heretofore described. A new supply of material is then placed in the chamber 1 and the operation as above described is continued. It will be observed that this method of operation gives me a continuous process involving the use of two tanks for solvent and that after the first charge of waste product material each separate supply of solvent is made to successively submerge and act upon 3 charges of material and each charge of material is acted on by two supplies of solvent.

Having thus described my invention what I claim is:

1. The herein described continuous process which consists in placing material containing rosin in a closed chamber having an outlet pipe at the bottom, admitting a solvent to said chamber from a solvent tank to submerge said material heating said chamber, admitting steam to the upper part of said chamber to expel said solvent through said outlet back to said solvent tank passing steam up through the residue of said material in said chamber, removing said residue and placing a fresh supply of material in said chamber, admitting said previously used solvent to said chamber to submerge said fresh supply of material forcing said solvent through said outlet back to said solvent tank, admitting fresh solvent from a second tank to said chamber, forcing said second supply of solvent by steam pressure through said outlet back to its tank, passing steam up through the residue of material, removing said residue from said chamber and placing a fresh supply of material therein, admitting said first mentioned supply of solvent to said chamber to submerge said fresh supply of material forcing said saturated solvent by steam pressure through said outlet to a still, distilling said solvent to separate the contained rosin, condensing said solvent and forcing it back to said solvent tank.

2. The process of recovering rosin from waste products of the kind described consisting in dividing a quantity of solvent into two separated supplies, submerging successively three charges of said material with one supply of solvent, submerging the second and third of said charges of material successively with said second supply of solvent, distilling the first supply of solvent to separate the rosin, submerging a fourth charge of material with said second supply of solvent, and distilling said second supply of solvent.

In testimony whereof I affix my signature in presence of two witnesses.

FRANK L. HUGGINS.

Witnesses:
C. D. WEEKS,
M. S. WILLSON.